No. 826,548. PATENTED JULY 24, 1906.
F. W. DILL & J. R. HILL.
ROAD GRADER.
APPLICATION FILED OCT. 10, 1905.
2 SHEETS—SHEET 1.
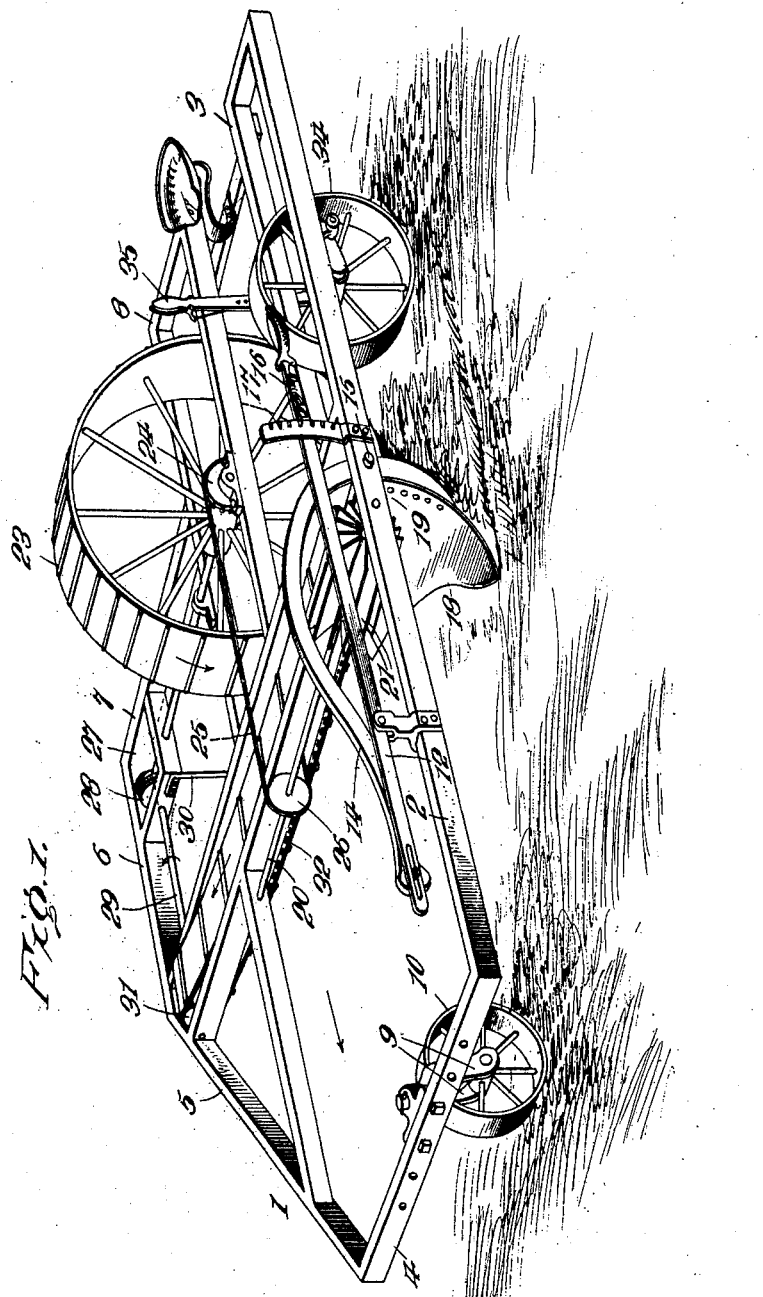
Witnesses
Inventors
F. W. Dill
J. R. Hill
By
Attorneys No. 826,548. PATENTED JULY 24, 1906.
F. W. DILL & J. R. HILL.
ROAD GRADER.
APPLICATION FILED OCT. 10, 1905.
2 SHEETS—SHEET 2.
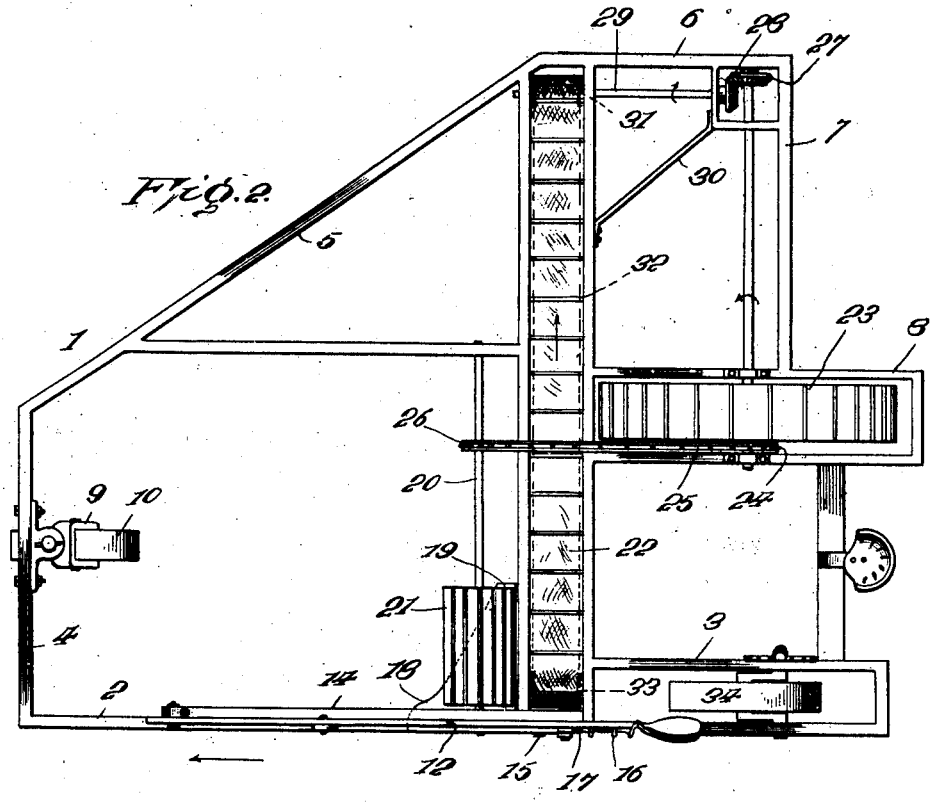
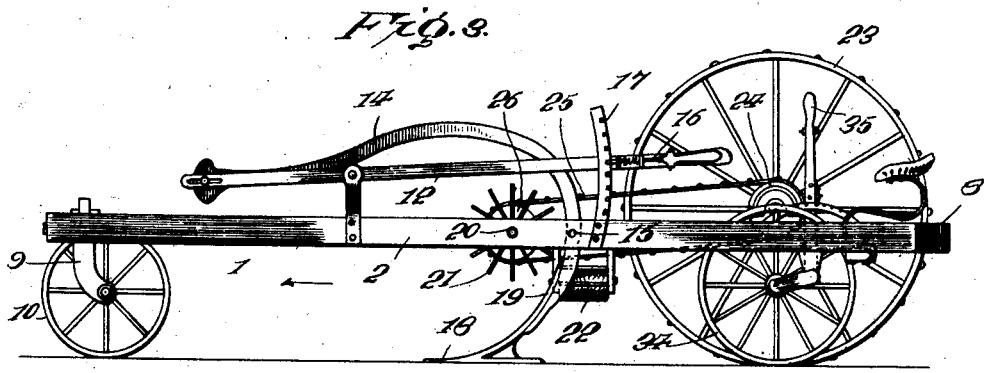
Witnesses
Inventors
F. W. Dill
J. R. Hill
By R. H. Lacey, Attorneys.

UNITED STATES PATENT OFFICE.

FREDERICK W. DILL AND JOHN R. HILL, OF LINCOLN, KANSAS.

ROAD-GRADER.

No. 826,548.      Specification of Letters Patent.      Patented July 24, 1906.

Application filed October 10, 1905. Serial No. 282,176.

*To all whom it may concern:*

Be it known that we, FREDERICK W. DILL and JOHN R. HILL, citizens of the United States, residing at Lincoln, in the county of Lincoln and State of Kansas, have invented certain new and useful Improvements in Road-Graders, of which the following is a specification.

This invention contemplates certain improvements in machines for grading roads; and its object is to provide a machine of this character which will operate efficiently to scrape or plow the soil from the hilly part of a road and automatically deposit it in depressed or lower portions thereof, the construction of the machine and arrangement of its parts being exceedingly simple and rendering the machine capable of being attended by one person.

For a full description of the invention and the merits thereof and also to acquire a knowledge of the details of construction of the means for effecting the result reference is to be had to the following description and accompanying drawings, in which—

Figure 1 is a perspective view of the grader. Fig. 2 is a top plan thereof. Fig. 3 is a side elevation.

Corresponding and like parts are referred to in the following description and indicated in all the views of the drawings by the same reference characters.

Referring to the drawings, 1 designates the framework of our improved road-grading machine, the same consisting of light but strong angle irons or rods embodying a main side bar 2, connected at its rear end with a longitudinal bar 3 and connected at the forward end with a clevis-bar 4, from which a brace 5 extends to the opposite side bar 6, and the latter is connected to a transverse rear bar 7, the other end of the latter being connected to the frame 8, as shown. The clevis-bar 4 is provided with any desired number of holes for the reception of the clevis in the arms 9, between which the wheel 10 is journaled. To the bar 2 of the framework there is connected an upright post, to which is fulcrumed a lever 12, the forward end of said lever being pivotally and slidably connected with the front end of a plow-beam 14, which is pivotally mounted in the framework on an axis 15. The other end of said lever is provided with the usual hand-retracted detent or latch 16, designed to engage a toothed standard 17. By this means the plow-beam may be operated to a greater or less degree and held in different positions, as may be desired. The plow-beam 14 carries a grading-plow 18, the moldboard 19 of which extends rearwardly and upwardly to a greater height than the usual plow-moldboard. On the shaft 20 there is journaled a revoluble scraper 21, provided with any desired number of blades and designed to scrape the soil turned up onto the moldboard off of the latter onto a transversely-moving conveyer 22, which extends over to a point about the middle of the road or to the opposite end of the framework, as shown. In the frame 8 is mounted the main traveling wheel 23, which also acts as a drive-wheel, and for this purpose the shaft thereof is provided with a sprocket-wheel 24, connected by a chain 25 to a sprocket-wheel 26, mounted on the shaft 20 of the scraper for the purpose of rotating the latter. Also on the shaft of the main wheel 23 is secured a beveled gear-wheel 27, which meshes with a similar wheel 28 on the end of a shaft 29, which extends longitudinally, as shown, and is mounted in braces 30. The other end of the shaft 29 carries a sprocket-wheel 31, over which extends a sprocket-chain 32, the other end of said chain passing over a sprocket-wheel 33 at the opposite side of the framework. As the wheel 23 moves along it is evident that it will actuate the carrier through the connection just described to discharge the soil deposited on the carrier from the scraper 21 away to one side of the machine, where it may be deposited or discharged to fill up hollow places in the road. At the rear end of the machine and at one side thereof is a furrow-wheel 34, which is so mounted on the lock-shaft with a raising and lowering lever 35 that by manipulation of said lever the entire framework may be raised or lowered at one side bodily in order to hold the plow as a whole clear of the ground or to lower it in operative contact therewith.

Having thus described the invention, what is claimed as new is—

1. A machine of the character described comprising a framework, a plow mounted thereon and provided with a moldboard, a revoluble scraper mounted in the framework and provided with blades designed to scrape the soil from the moldboard, a transversely-movable conveyer mounted in the framework with one end adjacent said scraper and designed to receive the soil therefrom, and an adjustable connection for the plow, said connection embodying a beam pivotally mounted in the framework, and a lever fulcrumed in the framework and pivotally connected at its front end to said beam, the rear, of said lever being arranged for adjustable connection with the framework.

2. A machine of the character described, comprising a framework and traveling wheels therefor, a plow provided with a beam pivotally mounted within the framework, a lever fulcrumed intermediate its ends on said framework and having a slotted connection with the front end of the plow-beam, a rear end of the lever being arranged for adjustable connection with the framework, a scraper for said plow, a transversely - extending conveyer mounted in the framework with one end arranged contiguous to said scraper, and means for actuating said scraper and conveyer by the movement of said traveling wheels.

3. A road-grader comprising a framework embodying side bars, traveling wheels mounted in said framework, an adjustable plow connected to one side bar of the frame, a revoluble scraper mounted in the framework adjacent said plow, a transversely-extending conveyer having one end mounted in the framework contiguous to the scraper and its other end mounted on the opposite side of the framework, a sprocket-and-chain connection between the shafts of one of the traveling wheels and the scraper, and a beveled pinion connection between the said traveling-wheel shaft, and the shaft of the belt conveyer.

4. A road-grader comprising a framework embodying side bars and traveling wheels mounted therein, an upright post secured to one side bar of the framework, a lever fulcrumed intermediate its ends on said post and provided at one end with a slot and at the other end with a handle and latch, a toothed standard secured to the said side bar of the framework and arranged for connection with the latch of the lever, a plow the beam whereof is pivotally connected to said side bar and at its forward end is provided with a pin engaged in the slot of the lever, a revoluble scraper mounted in the framework adjacent the moldboard of the plow, a transversely-extending conveyer in the framework and arranged with one end contiguous to said scraper, and an operative connection between the scraper and a traveling wheel and also between the latter and the conveyer.

5. A road-grader comprising a framework embodying side bars and cross-bars to one of which latter is connected a colter-wheel, a traveling wheel in said framework, a cranked furrow-wheel also mounted in said framework and provided with means for vertically adjusting the framework with relation thereto to raise and lower the framework, a plow the beam whereof is pivotally connected to a side bar of the framework, means for raising and lowering the front end of said beam, and a scraper and conveyer operatively connected to said traveling wheel.

In testimony whereof we affix our signatures in presence of two witnesses.

FREDERICK W. DILL. [L. S.]
JOHN R. HILL. [L. S.]

Witnesses:
W. W. RAHMEIER,
E. A. McFARLAND.